No. 795,418. PATENTED JULY 25, 1905.
C. RAW.
HUB AND BRAKE FOR AUTOMOBILES.
APPLICATION FILED SEPT. 26, 1904.
2 SHEETS—SHEET 1.
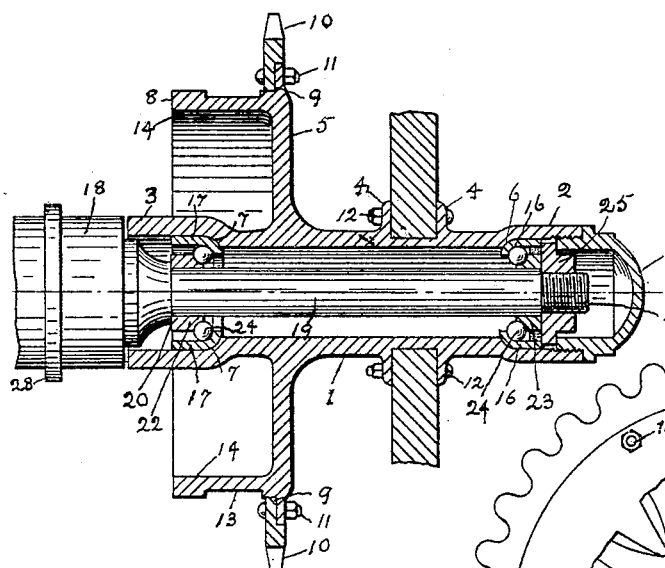
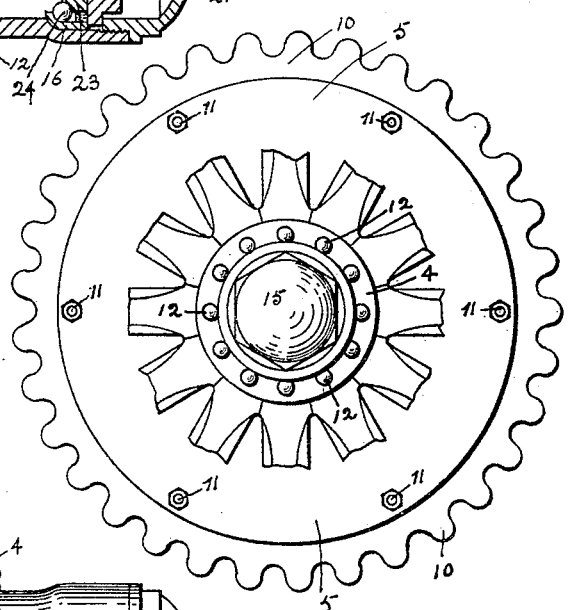
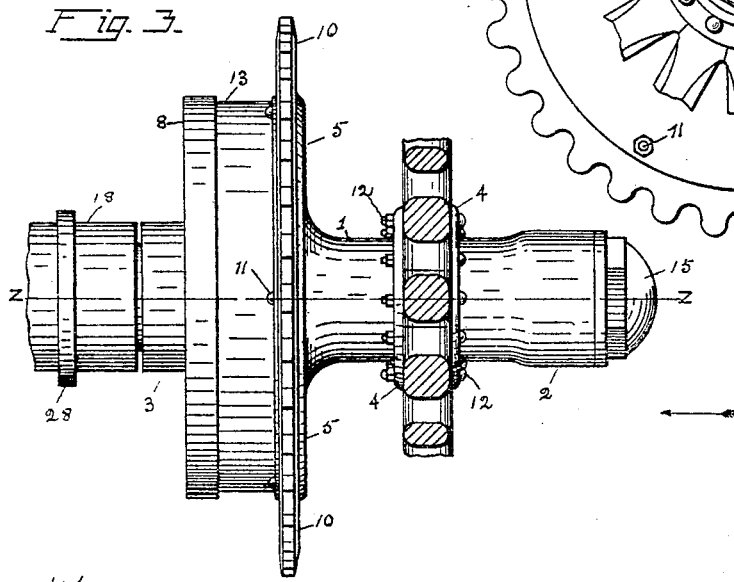
WITNESSES:
INVENTOR:
Charles Raw
By Robt. B. Wilson
Attorney.

No. 795,418. PATENTED JULY 25, 1905.
C. RAW.
HUB AND BRAKE FOR AUTOMOBILES.
APPLICATION FILED SEPT. 26, 1904.
2 SHEETS—SHEET 2.
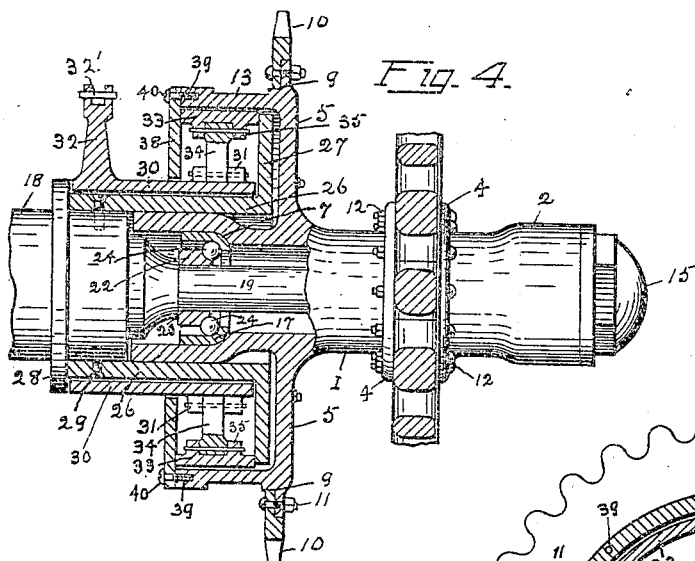
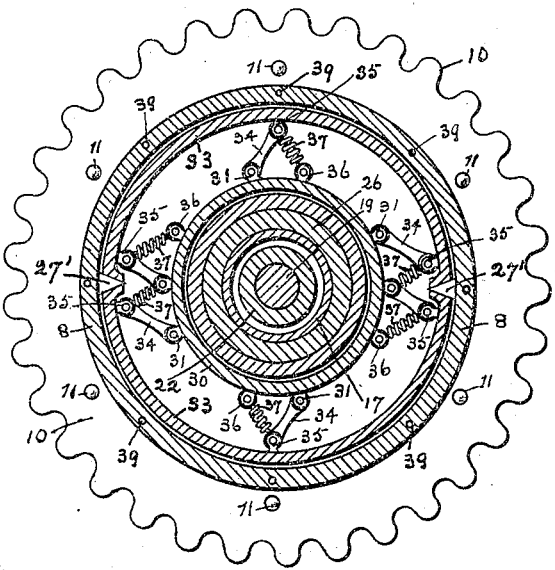
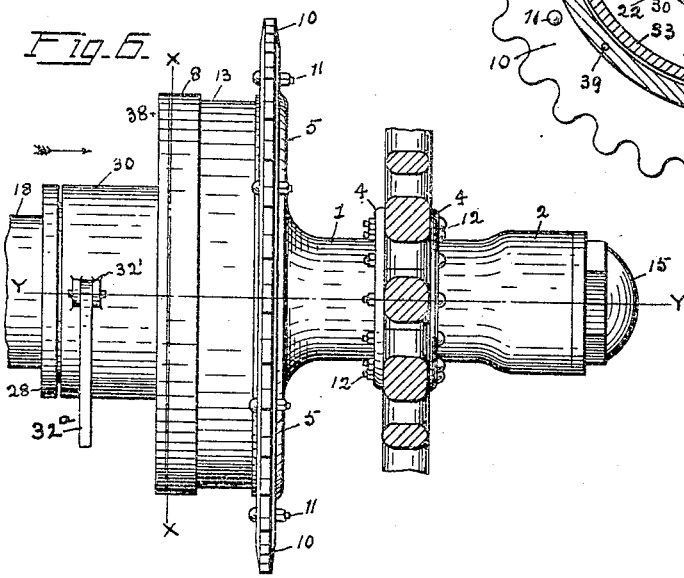
WITNESSES:
V. W. Morehouse
Grace Cowdrick
INVENTOR:
Charles Raw
by Robt. B. Wilson
Attorney

UNITED STATES PATENT OFFICE.

CHARLES RAW, OF TOLEDO, OHIO.

HUB AND BRAKE FOR AUTOMOBILES.

No. 795,418.     Specification of Letters Patent.     Patented July 25, 1905.

Application filed September 26, 1904. Serial No. 225,940.

*To all whom it may concern:*

Be it known that I, CHARLES RAW, a citizen of the United States, residing at Toledo, in the county of Lucas and State of Ohio, have invented a new and useful Improvement in Hubs and Brakes for Automobiles, of which the following is a specification.

My invention relates to a hub and brake for automobiles.

In that class of automobiles in which the rear wheels revolve on the axle and are provided with driving-gear by which the wheel is rotated as a driving-wheel for the vehicle so far as I am aware such driving-gear is secured both to the spoke-flanges and to the spokes by bolts which locate the gear farther inward on the axle than the inner bearings of the hub on the axle-journal, thereby causing an injurious leverage stress in opposite directions on the inner and outer bearings of the hub and preventing a true running of the wheel. The holes through the spokes for the attaching-bolts of the gear also greatly weaken the spokes and reduce the strength of the wheel under the twisting strain which is necessarily produced by applying the power for driving the wheel at the ends of the spoke-bolts at some distance from the spokes, and such construction is the frequent cause both of breaking the spokes of the wheel and injurious wear of the bearings of the hub. Such driving-gear usually has combined therewith a flange for the application of a brake for the wheel, which also adds to the injurious effects which necessarily result from such application of power to the wheel.

The object of my invention is to provide a driving-wheel of the class described with a hub having an integral flange adapted both for the application of a brake and for securing to the hub independent of the spokes and spoke-flange a suitable driving-gear for rotating the wheel on the axle, and thereby propelling the vehicle, with the brake and driving-flange located in a radial plane between radial planes intersecting the outer and inner bearings of the hub on the axle, whereby the stress of both the gear and the brake is divided without leverage stress on either between the outer and inner bearings of the hub on the axle.

A further object is to provide a hub of the kind last described with an efficient brake mechanism by which frictional pressures of optional resistance may be readily applied to the brake-flange of the hub, and which also forms an efficient dust-guard for the inner end of the hub.

I accomplish these objects by constructing a hub and a brake for the hub, as hereinafter described, and illustrated in the drawings, in which—

Figure 1 is a longitudinal section of my hub on line Z Z of Fig. 3, with the hub shown mounted on an axle-journal with a sprocket-gear rim attached to the brake-flange. Fig. 2 is an outer end view of my hub with sprocket-gear attached to brake-flange. Fig. 3 is a side elevation of my hub mounted on an axle and provided with a sprocket-gear rim attached to the brake-flange. Fig. 4 is a similar side elevation of my hub with the brake mechanism applied thereto and partly sectioned on line Y Y of Fig. 6. Fig. 5 is a view in cross-section on line X X of Fig. 6, and Fig. 6 is a side elevation of my hub and brake mechanism mounted on the axle and provided with a sprocket-gear mounted and secured to the brake-flange.

In the drawings, 1 represents the body of the hub constructed in accordance with my invention, which is formed of a single tubular metal casting having the enlarged outer end portion 2, the enlarged inner end portion 3, and the annular spoke-flanges 4 and the gear-flange 5, intermediate between the end portions 2 and 3. The cavity of the hub is also enlarged at the end portions to form the inner annular bearing-shoulders 6 and 7. The gear-flange 5 has integral therewith the annular brake-flange 8, extending toward the inner end portion 3 of the hub, and the annular rabbet 9, adapted for the attachment to the flange 5 of a toothed gear-rim 10 by bolts 11, through registering bolt-holes in the rim and the flange. The spoke-flanges are also provided with alined bolt-holes for the spoke-bolts 12. The brake-flange 8 is provided on its outer face with a suitable band-groove 13 for use when a band-brake is applied, and its inner face 14 is adapted for the application thereto of the brake-shoes hereinafter described.

The outer end portion 2 of the hub is internally threaded for a suitable distance to receive the closure-cap 15, threaded to run therein and close the outer end of the hub.

The bearing-shoulders 6 and 7 are respectively provided with the ball-cup bearings 16 and 17, the cup 16 being adapted to be inserted into its seat against the shoulder 6 from the outer end, and the cup 17 into its seat against the shoulder 7 from the inner end of the hub.

18 represents an axle having a journal 19, suitable for the hub. The journal 19 is provided with the inner shoulder 20 and the outer end threaded portion 21, and upon the journal are mounted the ball-bearing sleeves 22 and 23, the bearing-sleeve 22 at the inner end abutting the shoulder 20 of the journal and being complementary to the hub-bearing 17 and the bearing-sleeve 23, near the outer end of the journal, and being complementary to the hub-bearing 16. The bearings are provided with balls 24, suitable to each bearing, and upon the threaded end portion of the journal is run the adjusting-nut 25, which is adapted to abut the bearing-sleeve 23, and thereby to equally and simultaneously adjust, as will readily appear, both the inner and outer end bearings to their balls.

For the hub thus constructed and mounted I have provided a brake which is constructed and applied as follows: Upon the axle 18 is mounted the sleeve 26, which has integral therewith at its outer end the disk-flange 27. The inner end of the sleeve abuts the flange or collar 28 of the axle, and the sleeve is secured to the axle by the screws 29. The outer end portion of the sleeve extends over the inner end portion of the hub to near the gear-flange 5 of the hub, with the flange 27 within and concentric to the annular brake-flange 8. At opposite diametric points the flange 27 is provided with the triangular-shaped studs 27', extending therefrom horizontally and at right angles. Upon the fixed sleeve 26 is mounted the rotatable sleeve 30, which also extends from the flange 28 of the axle to the flange 27 of the sleeve 26, and the outer end portion of the sleeve 30 within the circle of the brake-flange 8 is provided at intervals, as shown in Fig. 5, with the radial hinge-bosses 31, and the inner end portion with the crank-lever 32, having its free end 32' bifurcated for receiving and pivoting thereto the connecting-rod $32^a$. Within and concentric to the brake-flange 8 are provided the semi-annular brake-shoes 33, which are connected to the brake-sleeve by the toggle-arms 34, the inner ends of which are pivoted to the bosses 31. The brake-shoes 33 are provided with the hinge-bosses 35, to which the outer ends of the toggle-arms are pivoted. The brake-sleeve 30 is also provided at regular intervals from the bosses 31 with bosses 36, from which extend to the bosses 35 of the shoes the coil-springs 37, the springs and the toggle-arms in the normal position of the sleeves, as shown in Fig. 5, diverging from the bosses 35 at equal angles to their respective connections with the sleeve 30. The ends of the brake-shoes 33 are angled to shoulder against the inclined faces of the studs 27', which prevent any rotative movement of the shoes when they are brought into frictional contact with the brake flange 8.

The free end of the cylindrical flange 8 is provided with the screw-seats 39 for the attachment thereto of the annular dust-plate 38 by the screws 40.

The lever 32 may be connected by the rod $32^a$ to any suitable lever conveniently located for operating the brake, and the connecting-rod $32^a$, being pulled forward, turns the brake-sleeve 30 on the sleeve 26, thereby moving the bosses 31 more nearly into radial alinement with the bosses 35 of the brake-shoes, whereby the shoes are moved by the toggle-arms 34 into contact with the face 14 of the brake-flange 8. It is apparent that by this construction both the friction of the shoes and power of the brake increases as the toggle-arms approach radial alinement with the bosses 31 and 35 and that such movement of the brake-sleeve lengthens the springs, the tension of which is adapted to reverse the movement of the sleeve and return the shoes to their normal position when the lever 32 is released from a pull thereon.

The sleeve 26, projecting over the inner end portion 3 of the hub, the plate 38, attached to the brake-flange, and the closure-cap 15 together form a complete protection against dust for both the hub-bearings and the brake mechanism.

By the construction shown and described I secure a hub for a driving-wheel having a durable integral flange adapted for the convenient attachment of a driving-gear independent of any attachment to the spokes of the wheel and which is so located that the stress of the gear is distributed between the bearings of the hub without leverage on either and which is also adapted for the application of a contracting band-brake or of an expansion shoe-brake. I have also produced for the hub thus provided a brake mechanism which combined therewith comprises efficient, durable, and reliable means for driving, controlling, and stopping a driving-wheel equipped therewith.

What I claim to be new is—

1. In a hub and brake for automobile driving-wheels, the combination with an axle-journal having ball-cup bearings at the inner and outer end portions of the journal, of a hub-body having an interior cavity to receive the axle-journal, the hub-body being provided within the cavity with integral, oppositely-disposed annular shoulders, extending into the cavity, one for the inner and one for the outer ball-cup bearings of the journal, and with annular integral exterior spoke-flanges adapted for the attachment of spokes, and an annular disk-flange adapted for the attachment thereto of a driving-gear rim, said disk-flange having integral therewith an annular brake-flange concentric to the hub-body, said disk-flange and said spoke-flanges extending radial to the hub-body in planes that intersect the hub between the shoulders for the ball-cup bearings, means to revolubly secure the hub on the axle-journal and compress the cup-bearings on the shoulders, and means mounted on the axle adapted to be brought into frictional engagement with the brake-flange, substantially as set forth.

2. In a hub and brake for automobile driving-wheels, the combination with a hub-body mounted on an axle, of interior bearing-shoulders formed and located in the end portions of the hub-body, a disk-flange integral with and concentric to the body of the hub in a radial plane intersecting the hub between the bearing-shoulders, said flange being adapted for the attachment of a toothed rim, an annular flange integral with the disk-flange concentric to the hub, adapted for the application of a brake, a sleeve mounted and secured on the axle and adapted to rotatably receive the inner end of the hub with a portion of the sleeve extending within the annular brake-flange and having an end disk-flange adjacent to and parallel with the disk-flange of the hub concentric to the brake-flange, a brake-sleeve rotatably mounted on the fixed sleeve, toggle-arms hinged by one end to the rotatable sleeve, brake-shoes hinged to the outer ends of the toggle-arms and having outer faces adapted to conform to the inner face of the brake-flange, said shoes being also provided with end shoulders, fixed shoulders abutting the end shoulders of the shoes, coil-springs connecting the rotatable sleeve and the brake-shoes, and means to rotate the brake-sleeve, substantially as set forth.

In testimony whereof I have signed my name to this specification, in the presence of two subscribing witnesses, this 20th day of September, 1904.

CHARLES RAW.

Witnesses:
V. W. MONHOUSE,
CHAS. A. BOOKE.